(12) United States Patent
Svetlik

(10) Patent No.: US 10,436,370 B2
(45) Date of Patent: Oct. 8, 2019

(54) PIPE ELBOWS AND METHODS OF MANUFACTURE

(71) Applicant: Georg Fischer Central Plastics LLC, Shawnee, OK (US)

(72) Inventor: Harvey E. Svetlik, Grand Prairie, TX (US)

(73) Assignee: Georg Fischer Central Plastics LLC, Shawnee, OK (US)

( * ) Notice: Subject to any disclaimer, the term of this patent is extended or adjusted under 35 U.S.C. 154(b) by 473 days.

(21) Appl. No.: 15/133,805

(22) Filed: Apr. 20, 2016

(65) Prior Publication Data

US 2017/0307124 A1  Oct. 26, 2017

(51) Int. Cl.
| F16L 43/00 | (2006.01) |
| B29C 65/82 | (2006.01) |
| B29C 65/00 | (2006.01) |
| B29C 65/02 | (2006.01) |
| B29L 31/24 | (2006.01) |
| F16L 47/02 | (2006.01) |

(52) U.S. Cl.
CPC ............ *F16L 43/008* (2013.01); *B29C 65/02* (2013.01); *B29C 65/8246* (2013.01); *B29C 66/114* (2013.01); *B29C 66/116* (2013.01); *B29C 66/1162* (2013.01); *B29C 66/5223* (2013.01); *B29C 66/52231* (2013.01); *B29C 66/52298* (2013.01); *B29C 66/54721* (2013.01); *B29C 66/71* (2013.01); *B29C 66/73921* (2013.01); *B29L 2031/243* (2013.01); *F16L 47/02* (2013.01)

(58) Field of Classification Search
CPC ................................ F16L 43/00; F16L 43/008

USPC .................. 285/179, 181, 184; 138/177, 178
See application file for complete search history.

(56) References Cited

U.S. PATENT DOCUMENTS

| 2,557,507 A * | 6/1951 | Lang, Jr. ................. F16M 11/10 285/153.2 |
| 2,933,891 A * | 4/1960 | Britt .......................... B64C 9/38 239/265.35 |
| 2,966,372 A * | 12/1960 | Phillips ................. F16L 43/008 285/179 |
| 3,235,184 A * | 2/1966 | Kalil ......................... F02K 9/84 239/265.35 |
| 3,596,935 A * | 8/1971 | McGeoch, Sr. ......... F16L 41/02 165/47 |
| 4,421,279 A * | 12/1983 | Drechsel ............... B05B 15/652 239/546 |
| 4,627,646 A * | 12/1986 | Kessel ................ B29C 66/1312 285/114 |

(Continued)

FOREIGN PATENT DOCUMENTS

CH          398211 A         8/1965

OTHER PUBLICATIONS

"Part QF Plastic Fusing", BPVC Section IX-Welding, Brazing, and Fusing Qualifications, Jul. 2013, pp. 271-294, ASME—The American Society of Mechanical Engineers, New York, NY.

*Primary Examiner* — Aaron M Dunwoody
(74) *Attorney, Agent, or Firm* — Bachman & LaPointe, P.C.

(57) ABSTRACT

A pipe elbow has a first end and a second end off parallel to the first end. An interior surface of the pipe elbow has a centerline having an arcuate portion. A circular cylindrical exterior surface portion of the pipe elbow surrounds the arcuate portion of the centerline.

23 Claims, 5 Drawing Sheets

(56) References Cited

U.S. PATENT DOCUMENTS

| | | | | |
|---|---|---|---|---|
| 4,976,288 | A * | 12/1990 | Steele | B65G 53/521 |
| | | | | 138/120 |
| 5,054,819 | A * | 10/1991 | Grunwald | F16L 43/001 |
| | | | | 285/133.11 |
| 5,156,420 | A * | 10/1992 | Bokor | B29C 65/342 |
| | | | | 285/184 |
| 5,397,155 | A * | 3/1995 | Inda | F16L 47/32 |
| | | | | 285/179 |
| 6,114,631 | A * | 9/2000 | Gretz | F16L 27/0837 |
| | | | | 174/50.52 |
| 6,494,234 | B2 * | 12/2002 | Esser | F16L 43/001 |
| | | | | 138/109 |
| 7,857,059 | B2 * | 12/2010 | Shen | E21B 43/01 |
| | | | | 138/120 |
| 2001/0004153 | A1 * | 6/2001 | Byrnes | F16L 43/00 |
| | | | | 285/179 |
| 2002/0114908 | A1 * | 8/2002 | Evans | B29C 45/2614 |
| | | | | 428/36.9 |
| 2006/0012166 | A1 * | 1/2006 | Siferd | F16L 27/08 |
| | | | | 285/184 |
| 2009/0134619 | A1 * | 5/2009 | Houghton | F16L 43/00 |
| | | | | 285/39 |
| 2011/0316271 | A1 * | 12/2011 | Lalam | B23K 9/0282 |
| | | | | 285/179 |
| 2012/0248764 | A1 * | 10/2012 | Ericksen | F16L 43/008 |
| | | | | 285/331 |
| 2014/0020811 | A1 | 1/2014 | Wermelinger | |
| 2016/0131019 | A1 * | 5/2016 | Sakai | F01P 7/14 |
| | | | | 138/118 |
| 2017/0130883 | A1 * | 5/2017 | McNab | F16L 27/0841 |

\* cited by examiner

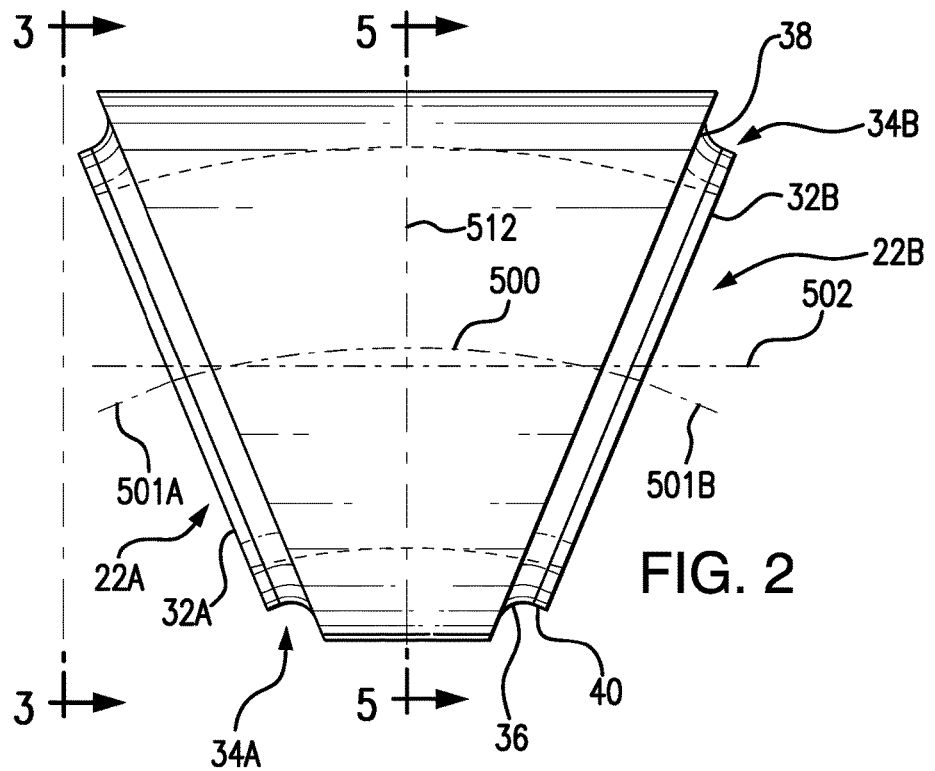
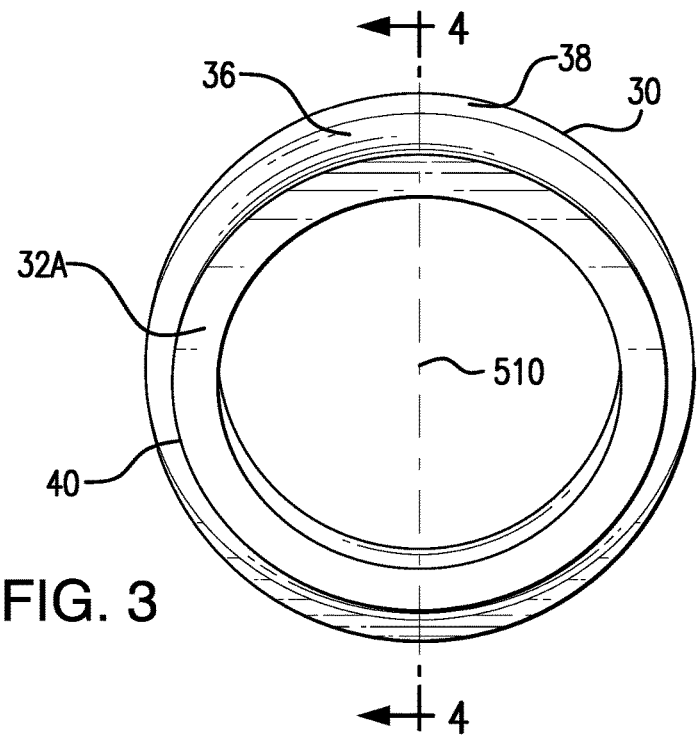

PIPE ELBOWS AND METHODS OF MANUFACTURE

BACKGROUND

The disclosure relates to plastic pipe. More particularly, the disclosure relates to forming of elbows for plastic pipe.

A variety of techniques are used to make pipe fittings (such as pipe elbows). For smaller diameter pipe, fittings may typically be molded. For larger diameter pipes, molding becomes relatively expensive. On the one hand, large molding machines and associated molds and corresponding large expense may be required. On the other hand, economies of scale may be relatively low. Accordingly, a variety of techniques have been proposed for assembling fittings from cut and/or machined pipe stock.

SUMMARY

One aspect of the disclosure involves a pipe elbow comprising: a first end and a second end off parallel to the first end; an interior surface having a centerline; and a circular cylindrical exterior surface portion surrounding an arcuate portion of the centerline and/or centrally between the ends.

In one or more embodiments of any of the foregoing embodiments, the circular cylindrical exterior surface portion is shorter to a concave side of the arcuate portion of the centerline than to a convex side of the arcuate portion of the centerline.

In one or more embodiments of any of the foregoing embodiments, the circular cylindrical exterior surface portion is not locally concentric with the interior surface.

In one or more embodiments of any of the foregoing embodiments, the circular cylindrical exterior surface portion is a central portion.

In one or more embodiments of any of the foregoing embodiments, the pipe elbow is formed of plastic.

In one or more embodiments of any of the foregoing embodiments, the pipe elbow is formed of polyethylene.

In one or more embodiments of any of the foregoing embodiments, a method for using the pipe elbow comprises joining said first end of said pipe elbow to an end of a pipe.

In one or more embodiments of any of the foregoing embodiments, the pipe elbow is a first said pipe elbow and the method further comprises: joining said second end of said first said pipe elbow to the first end of a second said pipe elbow.

In one or more embodiments of any of the foregoing embodiments, the joining comprises welding.

Another aspect of the disclosure involves a method for forming a pipe elbow. The method comprises: cutting a first precursor from a pipe, said pipe having an inner diameter surface and an outer diameter surface and a central longitudinal axis, said first precursor having a first end and a second end off parallel to the first end; machining to form an interior surface having an arcuate centerline; and machining to form welding interfaces at the first end and the second end.

In one or more embodiments of any of the foregoing embodiments, the pipe is a plastic pipe.

In one or more embodiments of any of the foregoing embodiments, the pipe is a polyethylene pipe.

In one or more embodiments of any of the foregoing embodiments, the method further comprises welding the pipe elbow end-to-end to another pipe elbow.

In one or more embodiments of any of the foregoing embodiments, the pipe elbow retains an intact portion of the pipe outer diameter surface.

In one or more embodiments of any of the foregoing embodiments, the machining to form the welding interfaces forms respective external shoulders at the first end and the second end.

In one or more embodiments of any of the foregoing embodiments, the first end is off-parallel to the second end by 15° to 50°.

In one or more embodiments of any of the foregoing embodiments, the first end is off-parallel to the second end by 40° to 50°.

In one or more embodiments of any of the foregoing embodiments, the machining to form the arcuate interior surface forms the arcuate interior surface with a centerline arcing by 15° to 50°.

In one or more embodiments of any of the foregoing embodiments, the machining to form the arcuate interior surface forms the arcuate interior surface with a centerline arcing by 40° to 50°.

In one or more embodiments of any of the foregoing embodiments, the machining to form the arcuate interior surface comprises a relative arcuate movement of a rotating cutter and the first precursor.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 2 is a side view of the fitting.

FIG. 3 is an end view of the fitting.

Like reference numbers and designations in the various drawings indicate like elements.

DETAILED DESCRIPTION

Figure 1:
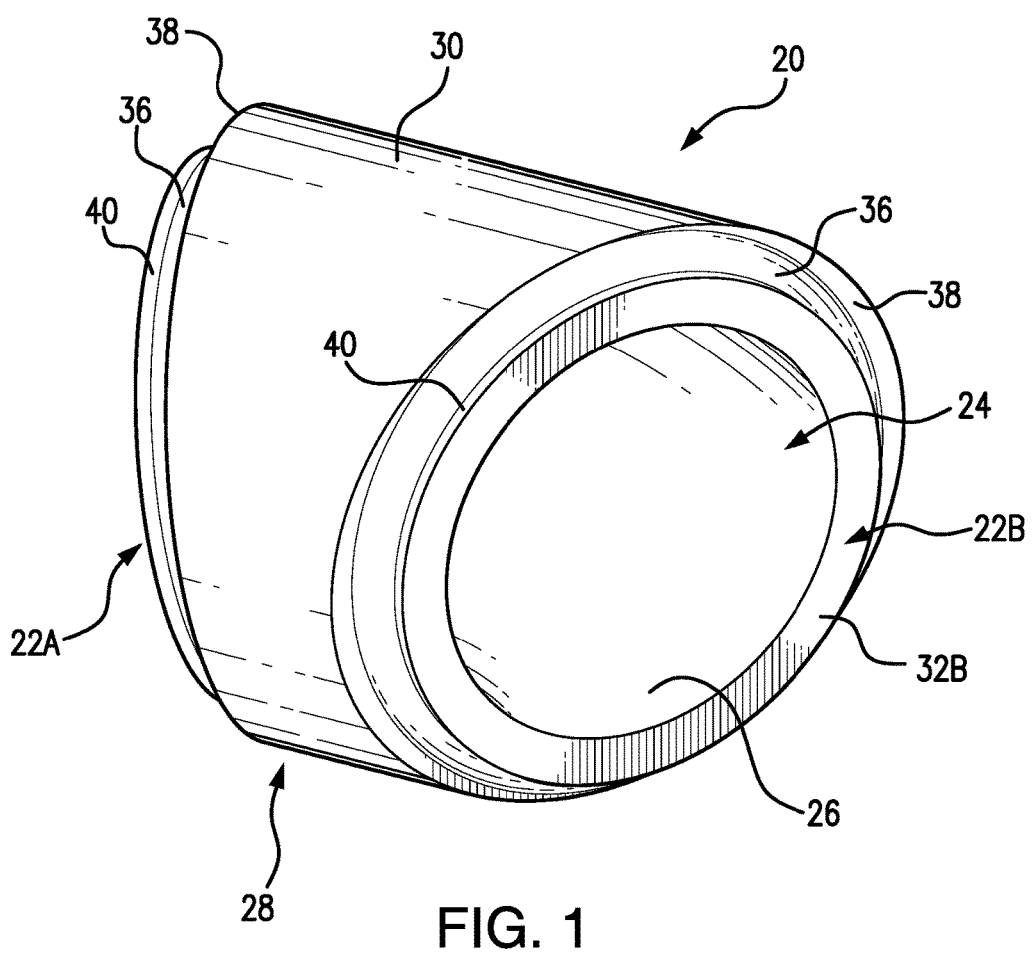
FIG. 1 is a view of an elbow fitting.

FIG. 1 shows a fitting 20 extending between a first end 22A and a second end 22B and having a central passageway 24. As is discussed further below, the fitting 20 is formed as a single plastic piece by cutting and machining from thick-walled plastic pipe stock (e.g., polyethylene or other weldable thermoplastic such as HDPE, PVC, ABS, nylon, PVDF, PP, PB, PA, PFA, ECTFE, PTFE, PEEK, and the like). The passageway 24 is defined by an interior (inner) surface 26 (also referred to as an inner diameter (ID) surface). A central portion 28 of the fitting has an exterior surface 30 (outer diameter (OD) surface) which may represent a surviving circular cylindrical portion of the OD surface of the original thick-walled pipe stock.

At respective ends 22A and 22B, rim surfaces (rims) 32A and 32B form connection surfaces of associated connection features 34A and 34B (FIG. 2). Exemplary connection features are fusion bosses for butt fusion joining to adjacent fittings or pipe segments. An exterior surface of the welding bosses is formed by an outwardly concave transition 36 to a base or shoulder surface 38 and optionally a short straight terminal portion 40 extending to the rim. As is discussed below, both the fusion boss rims and the associated pipe end(s) and/or fitting ends possess essentially the same nominal outside diameter and wall thickness and are both circular in geometry. Circularity of the rims may be within the standard circularity for plastic pipe (e.g., at most 5.0% eccentricity or at most 3.0%). Due to the machining, circularity will likely be even better (e.g., within 2.0%)

Figure 4:
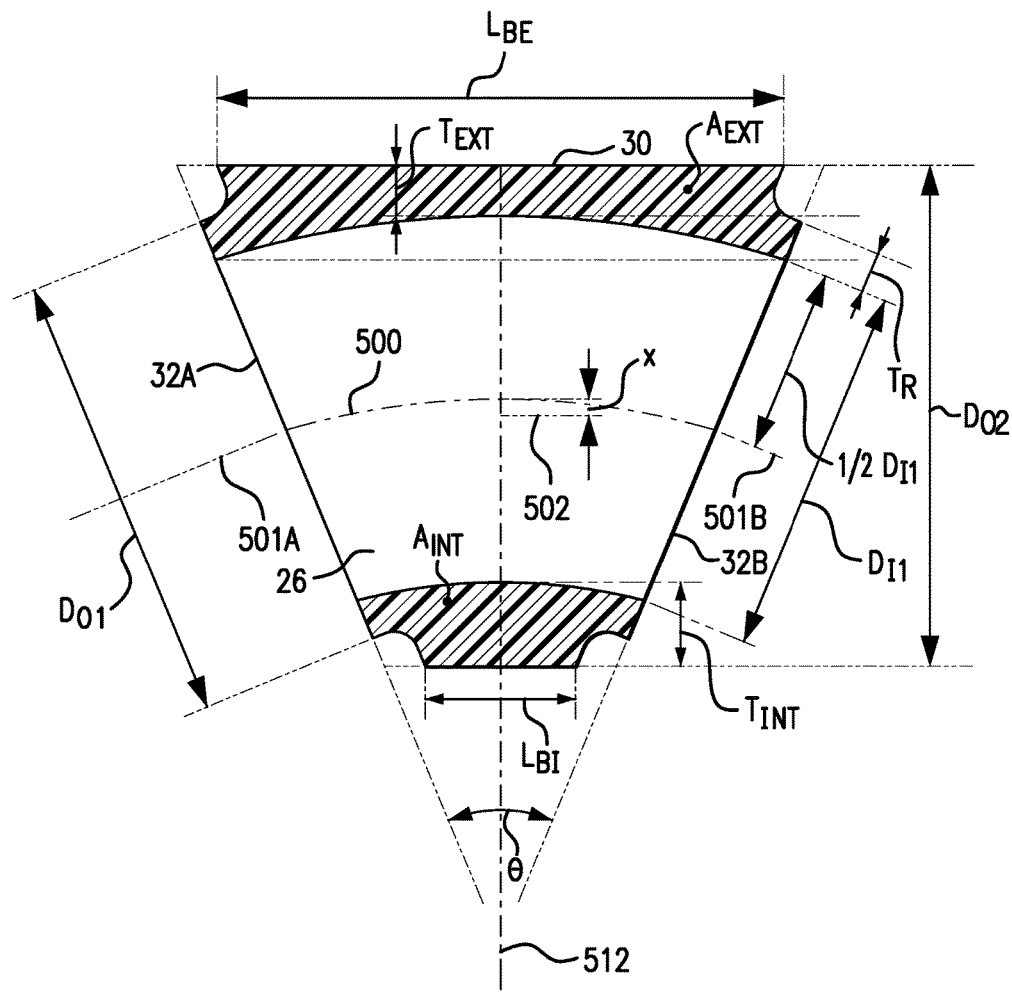
FIG. 4 is a longitudinal sectional view of the fitting taken along line 4-4 of FIG. 3.
Figure 5:
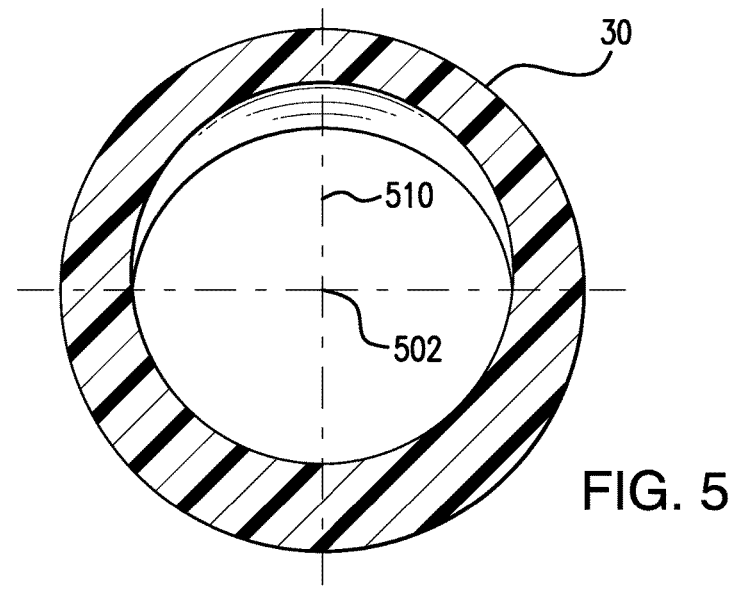
FIG. 5 is a transverse sectional view of the fitting taken along line 5-5 of FIG. 2.

FIG. 4 shows an angle θ between the rim surfaces 32A and 32B. The exemplary illustrated fitting 20 is a nominal 45° elbow with θ being 45°. Standard manufacturing tolerances may apply. The nominal 45° fitting would be expected to be within 5° of the nominal value, more particularly within 2° or 1°. FIG. 4 shows a centerline 500 of the interior surface 26 and passageway 24. The centerline or a portion thereof (e.g., a central portion surrounded by the intact surface 30) is arcuate corresponding to the elbow bend. The centerline may transition to straight at the ends. When viewed in the central longitudinal plane 510 of FIG. 3, the centerline 500 defines an outboard direction away from its convexity and an inboard direction away from its concavity corresponding to respective outboard and inboard directions of the turn made by the fitting. FIG. 4 also shows central normals 501A and 501B of the respective rim surfaces 32A and 32B which will coincide with the central axes of any pipes joined to the respective rims.

Figure 6:
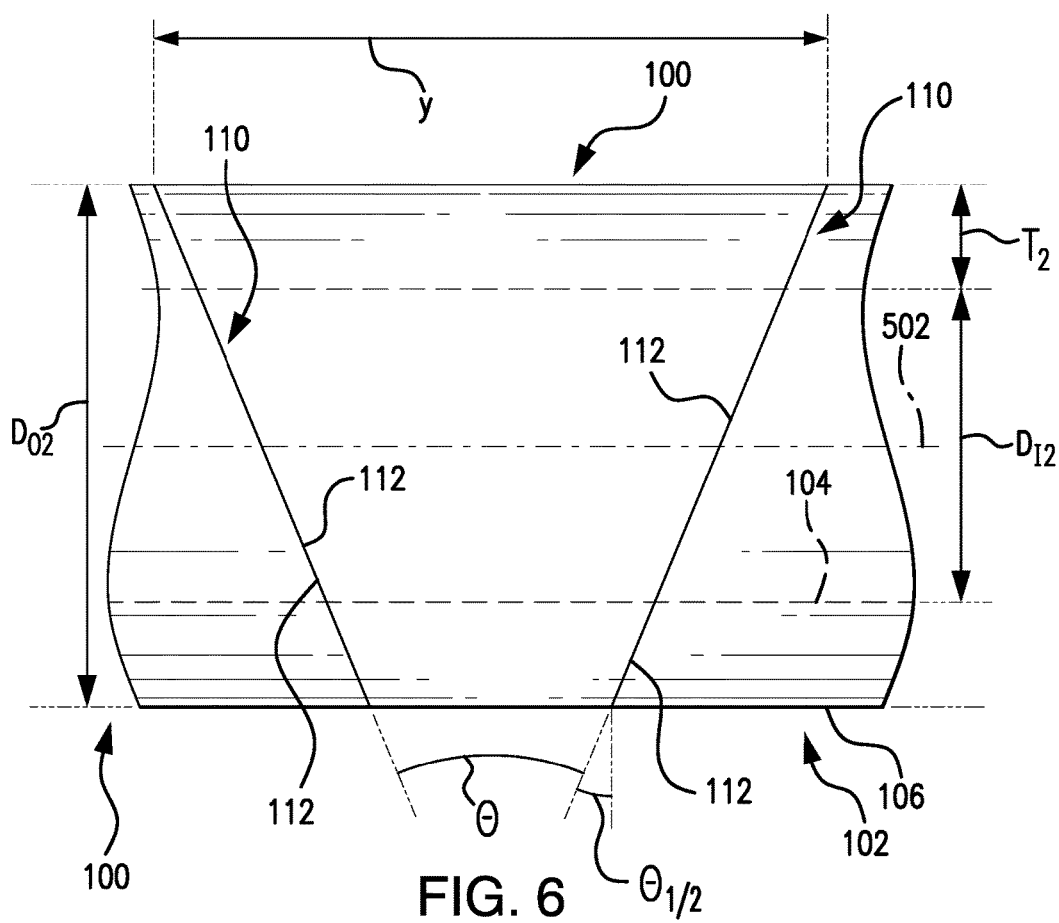
FIG. 6 is a view of a thick-walled pipe precursor of the fitting.

FIG. 4 also shows a central transverse plane 512 and a centerline 502 of the original pipe stock from which the fitting is formed (and thus of the OD surface 30). The passageway centerline 500 at the central transverse plane 512 is shown shifted outboard from the original pipe central line 502 by a distance x. It may possible to avoid this separation (e.g. if the passageway were shifted inboard (toward the apex of the turn) so that at the intrados the perimeter of the rim surfaces was closer to the OD surface of the original thick-walled pipe stock). FIG. 4 also shows rim outer diameter $D_{O1}$ and rim inner diameter $D_{I1}$. These may correspond to the respective OD and ID of the pipes to which the fitting is configured to mate. This leaves a rim thickness of $T_R$ which corresponds to the wall thickness of such mating pipe. FIG. 6 shows sequential precursors 100 of the fittings 20 being cut from a piece of thick-walled pipe stock 102. The pipe stock has an inner diameter (ID) surface 104 and outer diameter (OD) surface 106. The inner diameter is labeled $D_{I2}$ and the outer diameter is labeled $D_{O2}$. The wall thickness is half the difference and shown as $T_2$. In one exemplary embodiment, the pipe is a nominal 20-inch pipe having $D_{O2}$ being 20.0 inches (50.8 cm) and a wall thickness of 4.0 inches (10.2 cm) for an inner diameter of 12.0 inches (30.5 cm).

Sequential cuts 110 are made at angles of 0.5 θ alternating in orientation so as to produce precursors with pairs of cut surfaces 112 at the angle θ relative to each other.

To turn the precursors 100 into the fittings 20, the interior surface 26 is machined and the exterior forms of the connection features 34A and 34B are machined. In one example, the interior surface 26 is machined by orbiting a circular cutter effective to cut the inner diameter $D_{I1}$ along an arcuate path represented by the centerline 500. The cutting teeth may have rounded peripheral portions to allow the change in orientation without unnecessary biting and so as to leave a relatively smooth interior surface 26. The arcuate movement may be achieved via a robot (e.g., a six-axis robot carrying the cutter) or may be provided by a dedicated apparatus such as one having an arcuate track that the cutter follows. An alternative process involves using a fixed horizontal boring mill to machine the interior with a pivoting or rotary table holding/sweeping the thick-walled precursor.

To machine the connection features 34A, 34B, a female cutter may be plunged along the terminal centerlines 501A and 501B. This may slightly reduce the precursor faces 112 to form the rim surfaces 32A and 32B with a higher level of finish than provided by the sawn cuts 110. This also machines the OD portion of the features 34A, 34B and the shoulder surface 38.

Figure 7:
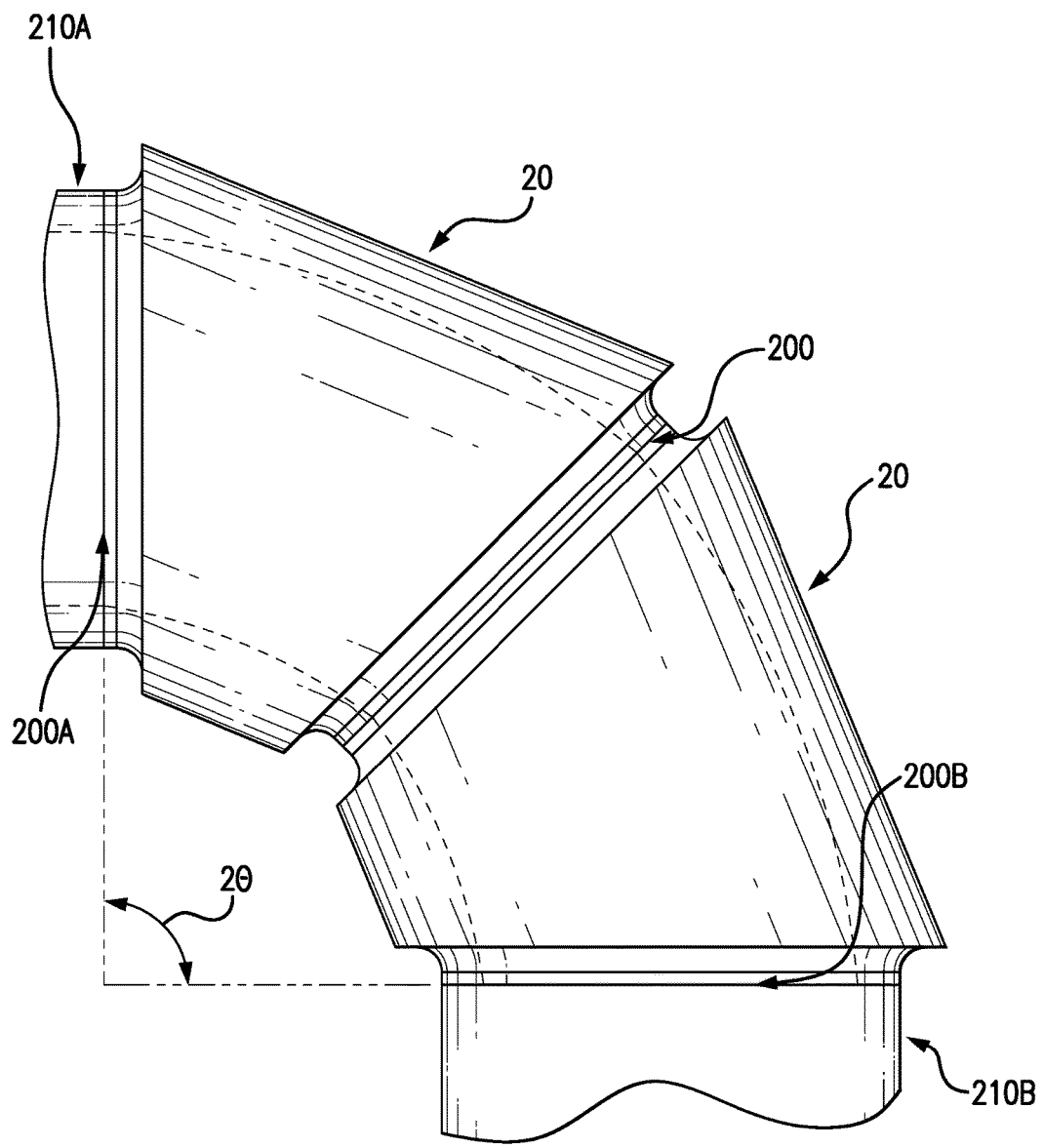
FIG. 7 is a side view of an assembly of fittings.

FIG. 7 shows an end-to-end assembly of two fittings 20 with a circular joint 200 such as a fusion joints. Exemplary joints may be formed via conventional butt fusion machines for joining fittings 20 to each other and to pipes. The exemplary configuration involves forming a 90° elbow. However, depending upon their relative orientation, other configurations could be achieved by the same two fittings. For example, if one of the fittings were rotated 180° about its centerline, the fitting assembly would form an offset with parallel but offset terminal axes. If the planes 510 of the two fittings 20 are not coplanar, a compound change interaction could be achieved such as to navigate about an obstacle. The ends of the 90° elbow are shown joined to respective pipe segments 210A and 210B at joints (e.g., joints) 200A and 200B. For purposes of illustration, protruding ID and OD fusion beads are not shown, if present, or may have been trimmed away after fusion. The exemplary configuration is merely illustrative of a very basic configuration. More complex assemblies may be made.

As is noted above, the exemplary angle θ is 45°. Other angles may be used. For example, using an angle θ of 30° would allow two joined fittings to form a 60° angle or three joined fittings to form a 90° angle. Theoretically, fittings larger than the nominal 45° would also be possible. Although an example of a nominal 18-inch pipe is given, a broader range of nominal pipe OD is 8 inches to 48 inches (20.32 cm) to (101.6 cm), more particularly, 12 inches to 24 inches (30.5 cm) to (61.0 cm).

As noted above, the central portion 28 is thicker and heavier than the pipe wall to which the fitting is to be joined. This provides enhanced pressure capacity. The pressure rating of pipe is calculated using a value referred to as the "dimension ratio" (DR). The DR is the ratio of outer diameter (OD) to wall thickness. A DR of 11 is used in the example below. The pressure rating of a machined elbow is expressed as the "equivalent dimension ratio" (EDR). Because the machined elbow is reinforced to overcome the physics and effect of geometry on the fitting design, the elbow is assigned an EDR designation.

For example a PE4710 DR 11 polyethylene pipe rated at 200-psi (1.38 MPa) at 73° F. (23° C.), shall be joined to an at least EDR 11 machined ID elbow, which also has an equal or greater pressure rating than said 200-psi (1.38 MPa) at 73° F. (23° C.) and the elbow joining faces have an OD and ID nominally matching the pipe OD and ID.

To verify that the pressure capacity of the elbow conforms to the specification and requirements of ASTM D3261 (Butt Heat Fusion Polyethylene Fittings for Polyethylene Pipe and Tubing), the elbow, with two short lengths of pipe with closure caps welded to its ends, is quickly pressurized in accordance with the requirements of ASTM D1599 (Resistance to Short Time Hydraulic Pressure of Plastic Pipe, Tubing, and Fittings), Procedure B. When 'Quick-Burst' testing the exemplary PE4710 machined ID elbow assembly to verify the EDR 11 rating, the test pressure exceeded the minimum required pressure of 580-psi (4.0 MPa) (D3261; Chart 9; DR 11), and frequently exceeded 800-psi (5.52 MPa) at forced rupture.

To further validate and verify the pressure capacity of the exemplary embodiment, PE4710 elbow, with heat fusion welded pipe to each end with closure caps, is subjected to elevated temperature accelerated testing in accordance with the specification and requirements ASTM D3261-10a, Chart 10, Condition 1: 750-psi (5.17 MPA) pipe hoop-stress for 200 hours at 80° C. For an EDR 11 fitting, the performance test is 150-psi (1.03 MPa) internal hydrostatic pressure at ambient temperature of 80° C., exceeding 200 hours duration. The exemplary fitting in all DR passes the 200-hour term of this elevated temperature test.

To further verify the pressure capacity of the exemplary embodiment, the PE4710 EDR 11 elbow, with heat fusion welded pipe to each end with closure caps, is subjected to 1600-psi (11.0 MPa) hoop-stress at 73° F. (23° C.) for no less than 1000-hours, in accordance with the requirements of ASTM D2513 (Polyethylene Gas Pressure Pipe, Tubing, and Fittings), Paragraph 5.7 Sustained Pressure Test (per ASTM D1598). The assembly passed the endurance duration of no less than 1000-hours subjected to internal hydrostatic test pressure of 320-psi (2.20 MPa) at ambient temperature of 73° F. (23° C.).

The 73° F. (23° C.) pressure rating (PR) of cylindrical pipe is calculated as $$PR = \frac{2\sigma}{DR - 1},$$

where: σ=hydrostatic design stress for each plastic. The 73° F. (23° C.) pressure rating of the fully reinforced bend (elbow) fitting, is calculated as $$PR = \frac{2\sigma}{EDR - 1}.$$

The central portion 28 intrados length $L_{BI}$ (FIG. 4) must be sufficiently wide to enable adequate gripping in the clamps of the heat fusion machine. The central portion extrados length $L_{BE}$ may be substantially longer (e.g., extrados cut spacing y (FIG. 6) minus a saw-cut width and a small amount then lost machining the bosses). The amount greater will depend on the angle θ, but typically at least 50% longer.

To attain full pressure capacity equal to or greater than the plastic pipe to which the elbow fitting will be joined, the dimension ratio (DR) of the machined elbow extrados $DR_{EXT}=(D_{O2}/T_{EXT})$ is selected to be equal to or lower than the dimension ratio of the pipe and butt end weld faces 32A and 32B ($DR_{END}=(D_{O1}/T_R)$). Thus, $DR_{EXT} \leq DR_{END}$.

To further assure elbow full pressure capacity, the intrados dimension ratio $DR_{INT}=(D_{O2}/T_{INT})$ is selected to be lower than $DR_{END}$, (e.g., nominally in the range of 80% to 50% of $DR_{END}$).

To further assure elbow full pressure capacity, the extrados cross-sectional area along the plane 510 ($A_{EXT}$ (FIG. 4)) may be selected to be larger than the corresponding intrados area $A_{INT}$. For example in may be in the range: 100% $A_{EXT} \geq A_{INT} \geq 50\% A_{EXT}$.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A pipe elbow formed of plastic and comprising:
a first end and a second end off parallel to the first end;
an interior surface having a centerline; and
a circular cylindrical exterior surface portion surrounding an arcuate portion of the centerline.

2. The pipe elbow of claim 1 wherein:
the circular cylindrical exterior surface portion is shorter to a concave side of the arcuate portion of the centerline than to a convex side of the arcuate portion of the centerline.

3. The pipe elbow of claim 1 wherein:
the circular cylindrical exterior surface portion is not locally concentric with the interior surface.

4. The pipe elbow of claim 1 wherein:
the circular cylindrical exterior surface portion is a central portion.

5. The pipe elbow of claim 1 formed of polyethylene.

6. A method for using the pipe elbow of claim 1, the method comprising:
joining said first end of said pipe elbow to an end of a pipe.

7. The method of claim 6 wherein the pipe elbow is a first said pipe elbow and the method further comprises:
joining said second end of said first said pipe elbow to the first end of a second said pipe elbow.

8. The method of claim 6 wherein:
the joining comprises welding.

9. A method for forming the pipe elbow of claim 1, the method comprising:
cutting a first precursor from a pipe, said pipe having an inner diameter surface and an outer diameter surface and a central longitudinal axis, said first precursor having a first end and a second end off parallel to the first end;
machining the inner diameter surface to form said interior surface having said an arcuate centerline; and
machining to form said elbow first and second ends as respective welding interfaces at the first precursor first end and the first precursor second end.

10. The method of claim 9 further comprising:
welding the pipe elbow end-to-end to another pipe elbow.

11. The method of claim 9 wherein:
the machining to form the arcuate interior surface comprises a relative arcuate movement of a rotating cutter and the first precursor.

12. The pipe elbow of claim 1 wherein:
the first end is off-parallel to the second end by 15° to 50°.

13. The pipe elbow of claim 1 wherein:
the first end is off-parallel to the second end by 40° to 50°.

14. The pipe elbow of claim 1 wherein:
the centerline arcs by 15° to 50°.

15. The pipe elbow of claim 1 wherein:
the centerline arcs by 40° to 50°.

16. The pipe elbow of claim 1 wherein:
first and second fusion bosses are formed at the respective first end and second end;
at the respective first end and second end, rim surfaces form connection surfaces of the associated first and second fusion bosses for butt fusion joining to adjacent fittings or pipe; and
an exterior surface of each of the first and second fusion bosses has an outwardly concave transition to a base or shoulder surface.

17. The pipe elbow of claim 1 wherein:
in a central longitudinal section the interior surface along an extrados is concave and along an intrados is convex.

18. A pipe elbow formed of plastic and comprising:
a first end and a second end off parallel to the first end;
an interior surface having a centerline; and
a circular cylindrical exterior surface portion centrally between the ends.

19. The pipe elbow of claim 18 wherein:
a portion of the interior surface centerline is arcuate corresponding to the elbow bend and a turn of the interior surface; and
in central longitudinal section, the centerline defines an outboard direction away from the convexity of the centerline and an inboard direction away from the concavity of the centerline corresponding to respective outboard and inboard directions of the turn.

20. The pipe elbow of claim 1 wherein:
the arcuate portion of the interior surface centerline corresponds to a turn of the interior surface; and
in central longitudinal section, the centerline defines an outboard direction away from the convexity of the centerline and an inboard direction away from the concavity of the centerline corresponding to respective outboard and inboard directions of the turn.

21. The pipe elbow of claim 1 wherein:
the arcuate portion of the interior surface centerline corresponds to a turn of the interior surface;
in central longitudinal section, the centerline defines an outboard direction away from the convexity of the centerline and an inboard direction away from the concavity of the centerline corresponding to respective outboard and inboard directions of the turn; and
in said central longitudinal section, an extrados is thinner along a transverse centerplane than is an intrados.

22. The pipe elbow of claim 1 wherein:
the arcuate portion of the interior surface centerline corresponds to a turn of the interior surface;
in a central longitudinal section, the centerline defines an outboard direction away from the convexity of the centerline and an inboard direction away from the concavity of the centerline corresponding to respective outboard and inboard directions of the turn; and
in said central longitudinal section, an extrados is thickens away from a transverse centerplane and an intrados thins away from the transverse centerplane.

23. The pipe elbow of claim 18 formed of polyethylene.

* * * * *